US009715104B2

United States Patent
Kozu et al.

(10) Patent No.: US 9,715,104 B2
(45) Date of Patent: Jul. 25, 2017

(54) LIGHT-QUANTITY CONTROL APPARATUS AND OPTICAL APPARATUS

(71) Applicant: CANON DENSHI KABUSHIKI KAISHA, Chichibu-shi (JP)

(72) Inventors: Satoshi Kozu, Tokyo (JP); Akira Fujita, Tokyo (JP)

(73) Assignee: Canon Denshi Kabushiki Kaisha, Chichibu-shi (JP)

( * ) Notice: Subject to any disclaimer, the term of this patent is extended or adjusted under 35 U.S.C. 154(b) by 281 days.

(21) Appl. No.: 14/146,323

(22) Filed: Jan. 2, 2014

(65) Prior Publication Data
US 2014/0111843 A1      Apr. 24, 2014

Related U.S. Application Data

(63) Continuation of application No. PCT/JP2012/004355, filed on Jul. 5, 2012.

(30) Foreign Application Priority Data

Jul. 7, 2011  (JP) .................................. 2011-150637

(51) Int. Cl.
| | |
|---|---|
| G02B 26/02 | (2006.01) |
| G02B 5/00 | (2006.01) |
| G03B 9/02 | (2006.01) |
| G03B 9/06 | (2006.01) |
| G03B 9/10 | (2006.01) |

(52) U.S. Cl.
CPC .............. *G02B 26/02* (2013.01); *G02B 5/005* (2013.01); *G03B 9/02* (2013.01); *G03B 9/06* (2013.01); *G03B 9/10* (2013.01)

(58) Field of Classification Search
CPC ...... G02B 26/02; G02B 26/007; G02B 5/005; G02B 5/205; G02B 7/006; G03B 9/08;
(Continued)

(56) References Cited

U.S. PATENT DOCUMENTS

| | | | |
|---|---|---|---|
| 4,027,167 A | 5/1977 | Pollermann | |
| 7,085,032 B2* | 8/2006 | Sato ........................ | G03B 9/06 348/E5.143 |

(Continued)

FOREIGN PATENT DOCUMENTS

| | | |
|---|---|---|
| JP | 2-153334 A | 6/1990 |
| JP | 2002-258133 A | 9/2002 |

(Continued)

OTHER PUBLICATIONS

English translation of JP 2007-094074, machine translated on Oct. 20, 2015.*

(Continued)

*Primary Examiner* — Jie Lei
(74) *Attorney, Agent, or Firm* — Fitzpatrick, Cella, Harper & Scinto

(57) ABSTRACT

The light-quantity control apparatus includes a base member, and a light-quantity control blade having a light-quantity control portion to control a quantity of light passing through a fixed aperture and a supported portion rotatably supported with respect to the base member. The light-quantity control portion and the supported portion of the light-quantity control blade are each rotated along a plane parallel to the aperture face, an intermediate portion thereof formed between the light-quantity control portion and the supported portion has a tilt with respect to the aperture plane toward the optical axis direction so that the light-quantity control portion is disposed distant from the supported portion in the optical axis direction. Thereby a concave space facing the fixed aperture is formed inside in the radial direction than the light-quantity control blade.

4 Claims, 5 Drawing Sheets

(58) Field of Classification Search
CPC ... G03B 9/22; G03B 9/07; G03B 9/10; G03B 9/02; G03B 9/06; G09F 9/372
USPC ....... 359/230, 233, 234, 236, 227, 888, 889, 359/892; 396/449, 461, 452, 471, 453, 396/500, 505, 510
See application file for complete search history.

(56) References Cited

U.S. PATENT DOCUMENTS

| | | | |
|---|---|---|---|
| 8,009,343 B2 | 8/2011 | Gellrich et al. | |
| 8,186,894 B2 | 5/2012 | Kuroki | |
| 2006/0033974 A1 | 2/2006 | Sato | |
| 2009/0021820 A1 | 1/2009 | Gellrich et al. | |
| 2011/0085223 A1* | 4/2011 | Ide | G03B 17/12 359/233 |
| 2011/0176798 A1* | 7/2011 | Kuroki | G03B 9/26 396/448 |
| 2014/0119719 A1 | 5/2014 | Kozu et al. | |

FOREIGN PATENT DOCUMENTS

| | | | |
|---|---|---|---|
| JP | 2004-184486 A | 7/2004 | |
| JP | 2005-84605 A | 3/2005 | |
| JP | 2006-53409 A | 2/2006 | |
| JP | 2006-330314 | * 12/2006 | .............. G03B 9/02 |
| JP | 2007-500869 A | 1/2007 | |
| JP | 2007-94074 A | 4/2007 | |
| JP | 2007-310412 A | 11/2007 | |
| JP | 2009-204423 A | 9/2009 | |
| JP | 2010-032673 A | 2/2010 | |
| JP | 2011-118378 A | 6/2011 | |
| WO | 2005/019878 A1 | 3/2005 | |
| WO | 2013/005436 A1 | 1/2013 | |

OTHER PUBLICATIONS

English translation of JP 2006-330314, machine translated on Oct. 20, 2015.*
Sep. 11, 2012 International Search Report in International Patent Appln. No. PCT/JP2012/004355.

* cited by examiner

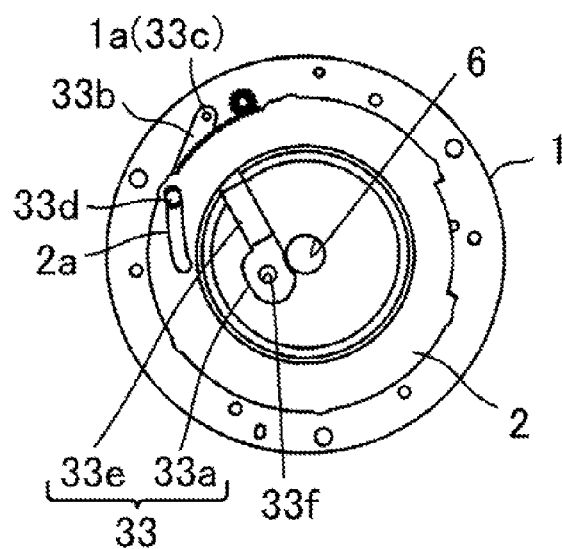
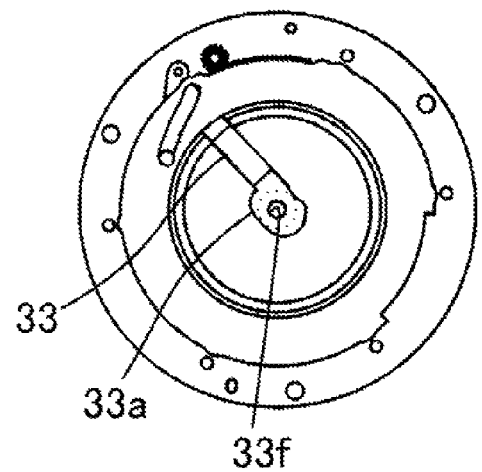
FIG. 7A
FIG. 7B
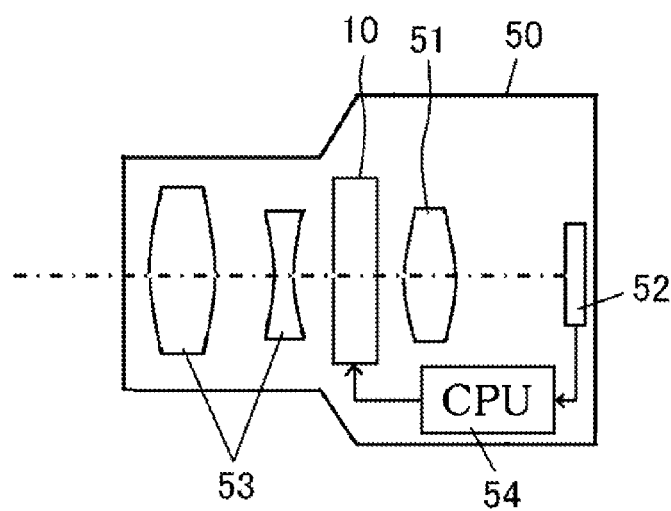
FIG. 8

LIGHT-QUANTITY CONTROL APPARATUS AND OPTICAL APPARATUS

CROSS-REFERENCE TO RELATED APPLICATIONS

This application is a continuation of International Patent Application No. PCT/JP2012/004355, filed on Jul. 5, 2012 which is hereby incorporated by reference herein in its entirety as if fully set forth herein.

BACKGROUND OF THE INVENTION

Field of the Invention

The present invention relates to a light-quantity control apparatus mounted on an optical apparatus such as a digital camera, a video camera, and an interchangeable lens.

Description of the Related Art

An optical apparatus such as a camera is necessary to have compactness. In particular, it is necessary to reduce the length, in an optical axis direction, of a lens barrel that protrudes from a camera body to hold an image capturing lens.

Japanese Patent Laid-Open No. 2007-310412 discloses a camera having a so-called retractable lens barrel that protrudes from a camera body during a camera use time (image capturing) and is housed (retracted) to the camera body during a camera non-use time (carrying). In this camera, a light-quantity control apparatus (aperture stop) and a lens are arranged adjacently to each other in an optical axis direction. Therefore, the length of the lens barrel in the retracted state is reduced by inserting a part of the lens into the aperture in the retracted state.

SUMMARY OF THE INVENTION

However, the camera disclosed in Japanese Patent Laid-Open No. 2007-310412 employs a configuration in which a part of the lens is inserted into a fully opened aperture (aperture more widely opened than a maximum aperture during image capturing). Therefore, it is necessary to increase a fully opened aperture diameter to be larger than an outer diameter of the lens. As a result, it is necessary to increase a size of a light-blocking blade (stop blade), which constitutes an aperture. This design requires increasing the size of an outer circumference space for retracting the light-blocking blade in a fully opened aperture state. Therefore, a size of the light-quantity control apparatus inevitably increases in a radial direction, which in turn makes it difficult to miniaturize a camera having the stop blade.

The present invention provides a light-quantity control apparatus with a reduced size in a radial direction that is capable of allowing a lens to be inserted in its internal space, and an optical apparatus having the light-quantity control apparatus.

The present invention provides as one aspect thereof a light-quantity control apparatus including a base member having a fixed aperture, and a light-quantity control blade having a light-quantity control portion to control a quantity of light passing through the fixed aperture and a supported portion rotatably supported with respect to the base member. When a direction orthogonal to an aperture plane of the fixed aperture is defined as an optical axis direction, and a direction extending along a diameter of the fixed aperture is defined as a radial direction, the light-quantity control portion and the supported portion of the light-quantity control blade are each rotated along a plane parallel to the aperture face, an intermediate portion thereof formed between the light-quantity control portion and the supported portion has a tilt with respect to the aperture plane toward the optical axis direction so that the light-quantity control portion is disposed distant from the supported portion in the optical axis direction, and thereby a concave space facing the fixed aperture is formed inside in the radial direction than the light-quantity control blade.

The present invention provides as another aspect thereof an optical apparatus including an optical system in which the above-described light-quantity control apparatus and a lens are arranged in an optical axis direction. At least part of the lens is insertable inside the concave space of the light-quantity control apparatus.

Other aspects of the present invention will become apparent from the following description and the attached drawings.

BRIEF DESCRIPTION OF THE DRAWINGS

FIGS. 7A and 7B are rear views illustrating an aperture stop apparatus that is Embodiment 3 of the invention; and FIG. 8 is a block diagram illustrating a configuration of a camera having the aperture stop apparatus of the embodiments.

DESCRIPTION OF THE EMBODIMENTS

Exemplary embodiments of the present invention will hereinafter be described with reference to the accompanying drawings.

[Embodiment 1]

Figure 1:
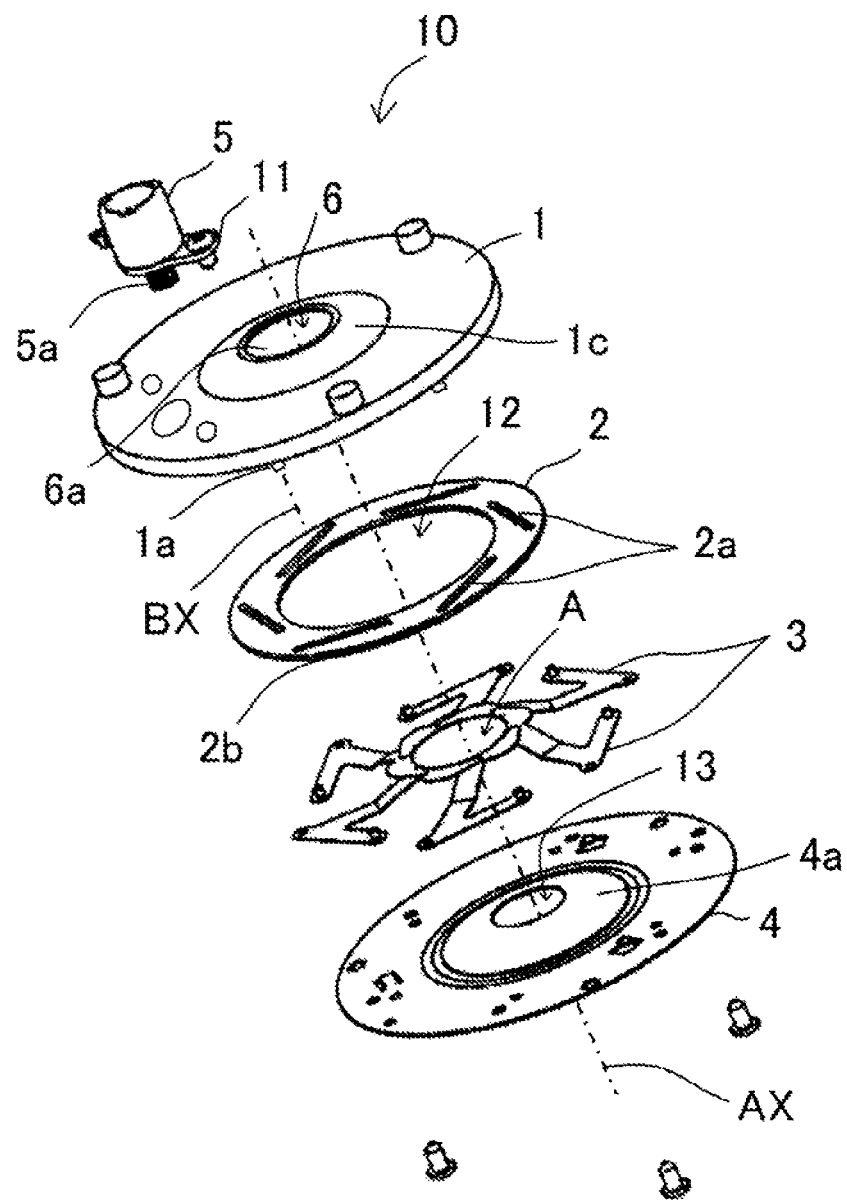
FIG. 1 is an exploded perspective view illustrating an aperture stop apparatus of Embodiment 1 of the invention.
Figure 2:
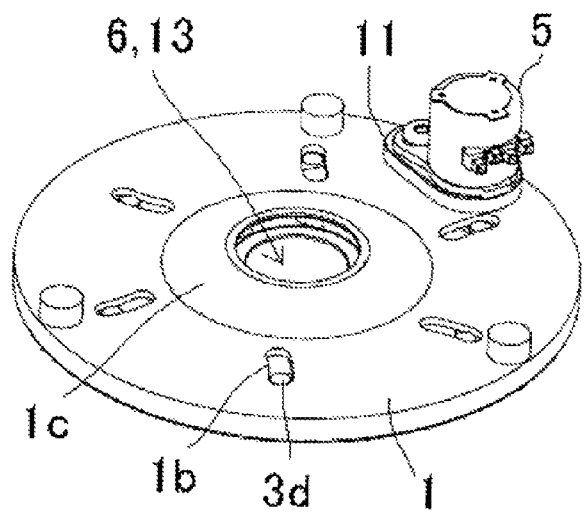
FIG. 2 is a rear perspective view illustrating the aperture stop apparatus of Embodiment 1.

FIGS. 1 and 2 illustrate an iris aperture stop apparatus 10 as a light-quantity control apparatus that is an embodiment of the present invention. In FIGS. 1 and 2, a base plate 1 as a base member includes a dome portion (cover portion) 1c having a domical shape (spherical surface or truncated conical surface) concave to a driving ring or a stop blade described below in an inner circumference side thereof. In a radial center of the dome portion 1c, a first fixed aperture 6 corresponding to a fully opened aperture is formed. In the following description, an axis passing through an aperture plane 6a of the first fixed aperture 6 and orthogonal to a center of the aperture plane 6a is referred to as an optical axis AX, and a direction where the optical axis AX extends is referred to as an optical axis direction.

At the ring portion surrounding the first fixed aperture 6 of the base plate 1, a support boss portion (convex portion) 1a and a long hole portion 1b illustrated in FIG. 2 are formed in a plurality of places of the circumferential direction, respectively. The center axes BX of each support boss portion 1a extend in parallel to the optical axis direction (optical axis AX).

In the radial center of a driving ring 2 as a driving member, a second fixed aperture 12 having an inner diameter larger than that of the first fixed aperture 6 is formed. In addition, in a plurality of circumferential places of the driving ring 2, cam groove portions 2a are formed. Furthermore, a driven gear 2b is formed in a part of the outer circumference of the driving ring 2.

Reference numeral 3 denotes a plurality of stop blades serving as a plurality of light-quantity control blades (light-blocking blades). Each stop blade is a thin plate member having a light-blocking property for forming, radially inside of the first fixed aperture 6 of the base plate 1, a stop aperture (light-passing aperture) A whose circumstance is a light-blocking area.

Figure 3A:
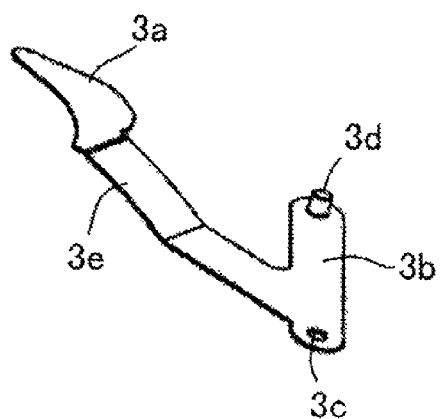
FIGS. 3A and 3B are perspective views illustrating a stop blade used in the aperture stop apparatus of Embodiment 1.
Figure 3B:
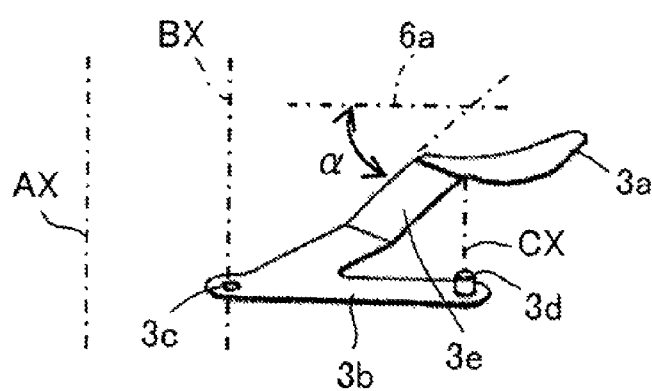

As illustrated in FIGS. 3A and 3B, each stop blade 3 includes a light-blocking portion 3a as a light-quantity control portion for forming the atop aperture A, a supported portion 3b supported rotatably with respect to the base plate 1 and the driving ring 2, and an intermediate portion 3e that connects the light-blocking portion 3a and the supported portion 3b.

The supported portion 3b is formed in a planar surface shape along a surface (aperture plane 6a of the first fixed aperture 6) orthogonal to the optical axis direction. A hole portion (concave portion) 3c where the support boss portion 1a formed in the base plate 1 is inserted is formed in the supported portion 3b. The stop blade 3 is rotatable with respect to the support boss portion 1a and the hole portion 3c relative to the base plate 1 and the driving ring 2. The center axis of the hole portion 3c matches the center axis BX of the support boss portion 1a.

In addition, a cam boss portion 3d inserted into and engaged with the cam groove portion 2a formed in the driving ring 2 and the long hole portion 1b formed in the base plate 1 is formed in the supported portion 3b. The center axis CX of the cam boss portion 3d extends parallel to the optical axis direction (optical axis AX).

The intermediate portion 3e has an tilt α with respect to the aperture plane 6a of the first fixed aperture 6 formed in the base plate 1 in the optical axis direction (this tilt α corresponds to an aperture plane of the second fixed aperture 12 formed in the driving ring 2 or an aperture plane of the third fixed aperture formed in a cover plate described below). The tilt α of the intermediate portion 3e causes the light-blocking portion 3a to be located distant from the supported portion 3b in the optical axis direction.

The light-blocking portion 3a has a shape curved to the optical axis direction in order to prevent the light-blocking portion 3a from being caught with any light-blocking portion 3a of other stop blades 3, which may hinder a smooth movement, relative to a planar shape in parallel with a surface (aperture plane 6a of the first fixed aperture 6) orthogonal to the optical axis direction.

In this embodiment, a description has been given of a case where the light-blocking portion 3a and the supported portion 3b are formed as different surfaces (discontinuous surface) and are connected by the intermediate portion 3e formed as a different surface. Alternatively, the light-blocking portion 3a and the intermediate portion 3e may be formed as a continuous curved surface, and the supported portion 3b may be formed as a surface different from the curved surface.

In FIG. 1, a cover plate 4 (cover member) that has a blade room for housing the driving ring 2 and the stop blade 3 between itself and the base plate 1. In the inner circumferential side of the cover plate 4, there is formed a dome portion 4a having a domical shape (spherical surface or truncated conical surface) convex to the base plate 1 and a stop blade (3) side. The dome portion 4a and the dome portion 1c of the base plate 1 are arranged so as to face the intermediate portion 3e and the light-blocking portion 3a of the stop blade 3 to form a blade room for housing them. In this manner, the portions of the base plate 1 and the cover plate 4 opposed to the intermediate portions 3e and the light-blocking portions 3a of a plurality of stop blades 3 are formed so as to protrude to a light-blocking portion (3a) side from the supported portion 3b in the optical axis direction relative to the circumferential portion thereof. A third fixed aperture 13 corresponding to the fully opened aperture is formed in the radial center of the dome portion 4a.

The cover plate 4 is attached to the base plate 1 using screws at its outer circumferential portion to be combined with the base plate 1. For this reason, similar to the base plate 1, the cover plate 4 can serve as a base member. It is noted that positions of the base plate 1 and the cover plate 4 may be exchanged.

In FIGS. 1 and 2, reference numeral 5 denotes a driving unit including an actuator such as a stepping motor has an output shaft to which a driving gear 5a meshing with the driven gear 2b of the driving ring 2 is installed. The driving unit 5 is fixed to the base plate 1 via a motor base plate 11. The driving unit 5 is arranged around the dome portion 1c of the base plate 1. In other words, the driving unit 5 is provided so as to protrude from the circumferential portion thereof in the same direction where the dome portion 1c protrudes relative to its circumferential portion. In this manner, the dome portion 1c and the driving unit 5 have the same protruding direction. This makes it possible to effectively use a space inside the optical apparatus (particularly, a space opposite to the side where the dome portion 1c and the driving unit are arranged) when the aperture stop apparatus is mounted on an optical apparatus such as a camera as described below in Embodiment 4. Consequently, miniaturization of the optical apparatus can be achieved.

Figure 4C:
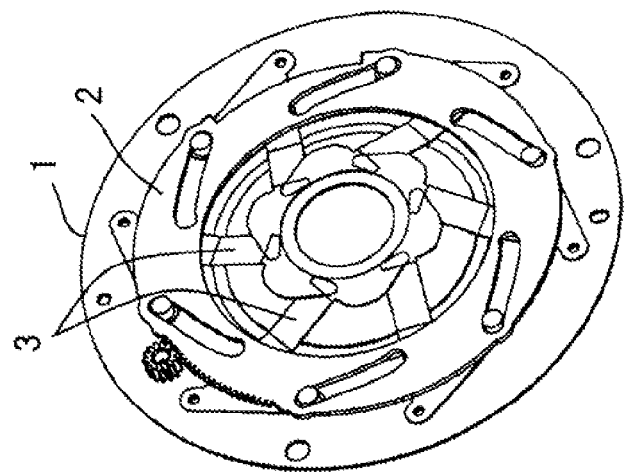
FIGS. 4A to 4C are explanatory diagrams illustrating operations of the aperture stop apparatus of Embodiment 1.
Figure 4B:
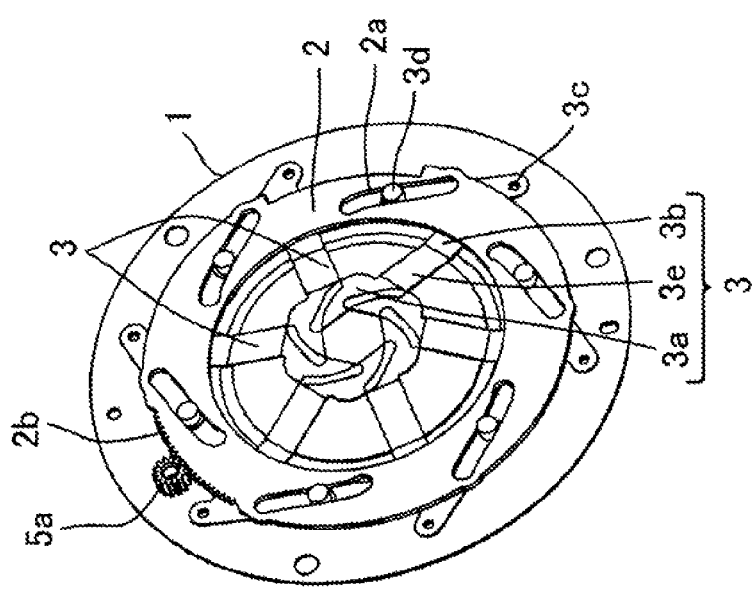
Figure 4A:
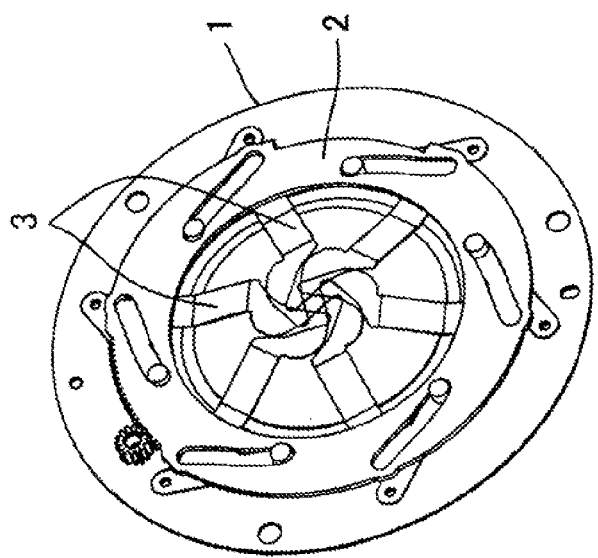

When the driving unit 5 is energized and thereby the driving gear 5a is rotated, its rotation force is transmitted to the driving ring 2 through the driven gear 2b as illustrated in FIGS. 4A and 4B, so that the driving ring 2 is rotated with respect to the optical axis relative to the base plate 1. The movement of the cam boss portion 3d formed in the supported portion 3b by the cam groove portion 2a formed in the driving ring 2 causes the stop blade 3 to be rotated with respect to the hole portion 3c of the supported portion 3b and the support boss portion la inserted thereto in a direction where the light-blocking portion 3a advances to or is retracted from the radially inner side area of the first and third fixed apertures 6 and 13, that is, in a direction of changing the size of the stop aperture (hereinafter, referred to as an open/close direction). In this case, the supported portion 3b and the light-blocking portion 3a of the stop blade 3 rotate along two virtual planes orthogonal to the optical axis direction (parallel to the aperture plane 6a) and located at different positions in the optical axis direction.

It is noted that, in this embodiment, a description has been given of a case where the support boss portion 1a formed in the base plate 1 and the cam boss portion 3d formed in the stop blade 3 are inserted into the hole portion 3c formed in the stop blade 3 and the cam groove portion 2a formed in the driving ring 2, respectively. Alternatively, a boss portion equivalent to the support boss portion 1a may be formed in the stop blade 3, or a boss portion equivalent to the cam boss portion 3d may be formed in the driving ring 2, so that the boss portion may be inserted into the hole portion formed in the base plate 1 or the cam groove portion formed in the stop blade 3.

Figure 5:
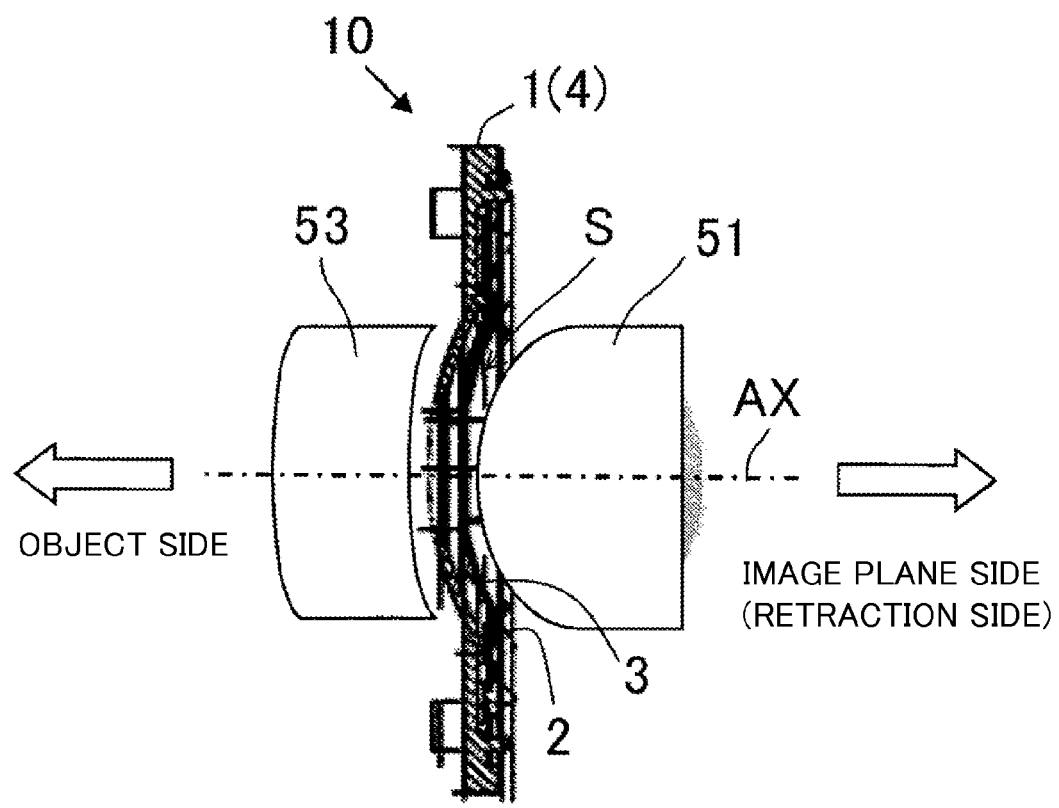
FIG. 5 is a side cross-sectional view illustrating the aperture stop apparatus of Embodiment 1.

In the aperture stop apparatus 10 configured in this manner, due to the tilt α of the intermediate portion 3e of the light-blocking blade 3 described above with respect to the optical axis direction, a concave space S having a depth from a supported portion (3b) side to the light-blocking portion (3a) side of a plurality of stop blades 3 in the optical axis direction is formed in the radially inner side relative to a plurality of stop blades 3 as described in FIG. 5. The supported portion side end of the concave space S is opened in the third fixed aperture 13 formed in the cover plate 4. On the other hand, the light-blocking portion side end of the concave space S is opened in the first fixed aperture 6 formed in the base plate 1. That is, the concave space S faces the first to third fixed apertures 6, 12, and 13.

It can be said that the concave space S is a space having an outer circumference surrounded by blade surfaces of the plurality of stop blades 3. However, in this embodiment, the blade surfaces of the plurality of stop blades 3 do not directly face the concave space S, and the dome portion 4a of the cover plate 4 that surrounds the concave space S is interposed between the concave space S and the blade surface of the stop blade 3. It is noted that the cover plate 4 (or the dome portion 4a) is not indispensable, but the blade surface of the stop blade 3 may directly face the concave space S by removing the cover plate 4 (or the dome portion 4a) if the stop blade 3 can be stably opened or closed.

[Embodiment 2]

FIG. 6 illustrates an aperture stop apparatus as a light-quantity control apparatus that is Embodiment 2 of the present invention. In FIG. 6, the same reference numerals denote the sane elements as in Embodiment 1, and the description thereof will be omitted. In Embodiment 1, a plurality of light-blocking blades rotates to change the size e of the stop aperture, thereby controlling the light-quantity. In contrast, in Embodiment 2, a single neutral density (ND) blade (light-quantity control blade) formed as a ND filter portion using a light-quantity control portion rotates to control the light-quantity.

A single support boss portion (convex portion) 1a is formed on the base plate 1 of Embodiment 2. In addition, a single cam groove portion 2a is formed in the driving ring 2 of Embodiment 2. The base plate 1 and the driving ring 2 are the same also in Embodiment 3 described below.

An ND blade 23 includes an ND filter portion 23a, a supported portion 23b supported rotatably with respect to the base plate 1 and the driving ring 2, and an intermediate portion 23e that connects the ND filter portion 23a and the supported portion 23b. A hole portion (concave portion) 23c where the support boss portion 1a formed in the base plate 1 is inserted is formed in the supported portion 23b. The ND blade 23 is rotatable about the support boss portion 1a and the hole portion 23c relative to the base plate 1 and the driving ring 2.

Figures 6A, 6B:
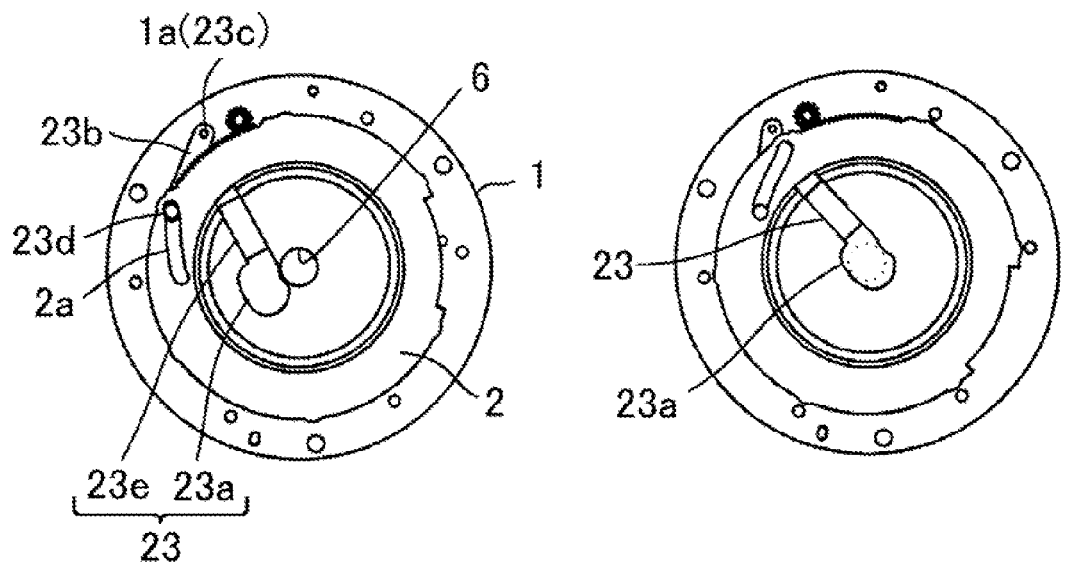
FIGS. 6A and 6B are rear views illustrating an aperture stop apparatus that is Embodiment 2 of the invention.

A cam boss portion 23d inserted into and engaged with the cam groove portion 2a provided in the driving ring 2 is formed in the ND blade 23. For this reason, the rotation of the driving ring 2 causes the ND blade 23 to be rotated, with the cam boss portion 23d moving along the cam groove portion 2a, as illustrated in FIGS. 6A and 6B. The ND blade 23 rotates between a position where the entire fixed aperture (only the first fixed aperture 6 of the base plate 1 is illustrated in the drawings) formed in the base plate 1 and the driving ring 2 is covered by the ND filter portion 23a as illustrated in FIG. 6B and a position where the ND filter portion 23a is perfectly retracted from the area facing the fixed aperture as illustrated in FIG. 6A, so that the light-quantity passing through the fixed aperture is controlled.

Similarly, in this embodiment, due to the tilt of the intermediate portion 23e of the ND blade 23 with respect to the aperture plane of the fixed aperture in the optical axis direction, a concave space facing each fixed aperture is formed in the radially inner side relative to the ND blade 23 with a depth from a supported portion (23b) side to an ND filter portion (23a) side in the optical axis direction.

Although not illustrated in the drawings, similar to the cover plate 4 of Embodiment 1, the aperture stop apparatus of Embodiment 2 has a cover plate for forming a blade room that houses the driving ring 2 and the ND blade 23 is provided between the cover plate and the base plate 1. This also applies to Embodiment 3 described below.

[Embodiment 3]

FIG. 7 illustrates an aperture stop apparatus as a light-quantity control apparatus of Embodiment 3 of the present invention. In FIG. 7, the same reference numerals denote the same elements as in Embodiments 1 and 2, and the description thereof will be omitted. In Embodiment 1, the plurality of light-blocking blades rotates to change the aperture, thereby controlling the light-quantity. In contrast, in Embodiment 3, a single stop blade having a fixed-size stop aperture rotates to control the light-quantity.

A stop blade 33 includes a stop portion 33a as a light-quantity control portion having a stop aperture 33f (light-passing aperture) smaller than the fixed aperture (only the first fixed aperture 6 formed in the base plate 1 is illustrated in the drawings) formed in the base plate 1 and the driving ring 2, a supported portion 33b supported rotatably with respect to the base plate 1 and the driving ring 2, and an intermediate portion 33e that connects the stop portion 33a and the supported portion 33b. A hole portion (concave portion) 33c where the support boss portion 1a formed on the base plate 1 is inserted is formed in the supported portion 33b. The stop blade 33 is rotatable about the support boss portion 1a and the hole portion 33c relative to the base plate 1 and the driving ring 2.

A cam boss portion 33d inserted into and engaged with the cam groove portion 2a provided in the driving ring 2 is formed in the stop blade 33. For this reason, the rotation of the driving ring 2 causes the stop blade 33 to be rotated, with the cam boss portion 33d moving along the cam groove portion 2a, is as illustrated in FIGS. 7A and 7B. The stop blade 33 rotates between a position where a small aperture 33f of the stop portion 33a is arranged to face the fixed aperture formed in the base plate 1 and the driving ring 2 as illustrated in FIG. 7B and a position where the stop portion 33a is perfectly retracted from the area facing the fixed aperture as illustrated in FIG. 7A, so as to control the light-quantity passing through the fixed aperture.

Similarly, in this embodiment, due to the tilt of the intermediate portion 33e of the stop blade with respect to the aperture plane of the fixed aperture in the optical axis direction, a concave space facing each fixed aperture is formed in the radially inner side relative to the stop blade 33 with a depth from a supported portion (33b) side to a stop portion (33a) side in the optical axis direction.

[Embodiment 4]

FIG. 8 illustrates a camera (video camera or still camera) as an optical apparatus having the aperture stop apparatus 10 described in Embodiments 1 to 3. Reference numeral 50 denotes a camera body, 51 and 53 a plurality of lenses included in an image capturing optical system, and 52 an image sensor, such as a charge-coupled device (CCD) sensor or a complementary metal oxide semiconductor (CMOS) sensor, for photo-electrically converting an object image formed by the image capturing optical system.

Reference numeral 54 denotes a controller, such as a central processing unit (CPU), for controlling operations of the aperture stop apparatus (driving unit 5) or the image sensor 52. It is noted that the aperture stop apparatus 10 may have a shutter function.

In such a camera, at least a part (convex surface) of the lens 51 adjacent to the aperture stop apparatus 10 in the optical axis direction can be inserted into the concave space S of the aperture stop apparatus 10 as illustrated in FIG. 5 again. It is noted that FIG. 5 illustrates an arrangement in which an entrance of the lens 51 to the concave space S is opened to the image surface direction, and the lens 51 adjacent to the aperture stop apparatus 10 in the image surface direction is inserted into the concave space S. The entrance of the lens 51 to the concave space S may be directed to the object such that lens 53 adjacent to the aperture stop apparatus 10 in the object direction is inserted into the concave space S.

A size (diameter) of the aperture serving as the entrance of the lens 51 to the concave space S is defined by a diameter of a circle passing through a boundary between the supported portion 3b and the intermediate portion 3e of the plurality of stop blades (or an inner diameter of the dome portion 4a corresponding to the circle) and does not depend on a size of the aperture A formed by the plurality of stop blades 3. For this reason, even when the aperture A is narrowed, it is possible to insert the lens 51 into the concave space S without setting the aperture A to the open aperture diameter or further increasing the aperture A. Therefore, it is possible to avoid an increase of the size in the radial direction of the aperture stop apparatus capable of inserting the lens into the internal space without necessity of increasing the maximum diameter of the aperture A depending on an outer diameter of the lens 51.

FIG. 8 also illustrates an arrangement in which the convex surface of the dome portion 4a of the cover plate 4 of the aperture stop apparatus 10 in the object side and the concave space of the image surface side of the lens 53 adjacent to the aperture stop apparatus 10 in the object direction are proximate to each other. In this manner, it is also possible to arrange the stop blade 3 of the aperture stop apparatus 10 in a narrow space between the convex surface of the object side of the lens 51 and the concave surface of the image surface side of the lens 53.

In addition, as illustrated in FIG. 5, a lens barrel for holding an image capturing optical system by arranging the aperture stop apparatus 10 and the lenses 51 and 53 in both sides thereof to adjoin each other may be housed (retracted) in the camera body.

The aperture stop apparatus 10 may be mounted not only on the camera illustrated in FIG. 8, but also on other optical apparatuses such as an interchangeable lens.

According to each of the embodiments, it is possible to insert a lens into the concave space formed in the inner side of the radial direction than the light-quantity control blade even when the light-quantity control blade is not opened to its fully opened state. Therefore, it is possible to implement a light-quantity control apparatus capable of suppressing a size increase in its radial direction and allowing an internal space to house a lens. In addition, it is possible to miniaturize an optical apparatus having the light-quantity control apparatus.

The present invention is not limited to these embodiments and various variations and modifications may be made without departing from the scope of the present invention.

What is claimed is:

1. A light-quantity control apparatus comprising:
a base member having a first fixed aperture;
a plurality of light-quantity control blades each having (a) a light-quantity control portion to control a quantity of light passing through the first fixed aperture and (b) a supported portion rotatably supported with respect to the base member;
a cover member which forms a blade room for housing the plurality of light-quantity control blades between itself and the base member and which has a second fixed aperture interconnecting with the first fixed aperture;
a driving member formed along a plane parallel to an aperture plane of the first fixed aperture, engaging with the supported portion, and rotating between the base member and the cover member to rotate the plurality of light-quantity control blades; and
a driver which drives the driving member,
wherein by rotating the plurality of light-quantity control blades by the rotation of the driving member in the blade room, the light-quantity control portion of the light-quantity control blade protrudes from the blade room into the first fixed aperture to change a size of a light-passing aperture formed in the first and second fixed apertures,
wherein when a direction orthogonal to an aperture plane of the first fixed aperture is defined as an optical axis direction, and a direction extending along a diameter of the first fixed aperture is defined as a radial direction, (a) the light-quantity control blade comprises (i) the light-quantity control portion, (ii) the supported portion, which is formed along the plane parallel to the aperture plane, and (iii) an intermediate portion formed between the light-quantity control portion and the supported portion so that the light-quantity control portion is disposed distant from the supported portion in the optical axis direction, and (b) the intermediate portion has a tilt with respect to the aperture plane toward the optical axis direction and thereby a concave space facing the first fixed aperture is formed inside in the radial direction with respect to the light-quantity control blade,
wherein the base member has a first dome portion having a convex shape and the first fixed aperture, the cover member has a second dome portion having a convex shape and the second fixed aperture, and the first dome portion and the second dome portion facing the first dome portion in the optical axis direction forms a part of the blade room,
wherein the plurality of light-quantity control blades form the light-passing aperture by rotating the light-quantity control portion from a state where the light-quantity control portion and the intermediate portion are housed between the first dome portion and the second dome portion toward a space between the first fixed aperture and the second fixed aperture so that a tip of the light-quantity control portion is inserted into the space, and
wherein the driving member and the driver are disposed around the first dome portion in the base member.

2. A light-quantity control apparatus according to claim 1, wherein the base member includes a cover portion that covers the intermediate portion of the light-quantity control blade, and
wherein the cover portion is formed so as to protrude, with respect to an outer circumferential portion thereof, from a supported portion side to a light-quantity control portion side in the optical axis direction.

3. A light-quantity control apparatus according to claim 1, wherein the driver includes an actuator that rotates the driving member,
- wherein the base member includes a cover portion that covers the intermediate portion of the light-quantity control blade,
- wherein the cover portion is formed so as to protrude, with respect to an outer circumferential portion thereof, from a supported portion side to a light-quantity control portion side in the optical axis direction, and
- wherein the driver is disposed in the outer circumferential portion of the base member so as to protrude therefrom toward a same direction where the cover portion protrudes.

4. An optical apparatus comprising:
- an optical system in which a light-quantity control apparatus according to claim 1 and a lens are arranged in an optical axis direction,
- wherein at least part of the lens is insertable inside the concave space of the light-quantity control apparatus.

* * * * *